(12) United States Patent
Wiseman

(10) Patent No.: US 9,788,670 B2
(45) Date of Patent: Oct. 17, 2017

(54) FRAMED ART HANGING SYSTEM UTILIZING A MAGNETIC CONNECTION COMBINED WITH A MECHANICAL CONNECTION

(71) Applicant: Wisick Creative Products, LLC, Southampton, NY (US)

(72) Inventor: Gregory Aaron Wiseman, Southampton, NY (US)

(73) Assignee: Wisick Creative Products, LLC, Southampton, NY (US)

( * ) Notice: Subject to any disclaimer, the term of this patent is extended or adjusted under 35 U.S.C. 154(b) by 0 days.

(21) Appl. No.: 14/794,131

(22) Filed: Jul. 8, 2015

(65) Prior Publication Data

US 2017/0007046 A1    Jan. 12, 2017

(51) Int. Cl.
*F16B 47/00* (2006.01)
*H01F 7/00* (2006.01)
(Continued)

(52) U.S. Cl.
CPC .............. *A47G 1/17* (2013.01); *A47G 1/1606* (2013.01); *A47G 1/168* (2013.01); *A47G 1/1613* (2013.01);
(Continued)

(58) Field of Classification Search
CPC .......... A47G 1/17; A47G 1/168; A47G 1/065; A47G 1/16; F16B 2001/0021; F16B 2001/0035
(Continued)

(56) References Cited

U.S. PATENT DOCUMENTS 2,127,078 A    8/1938  Zwicker
3,220,132 A    11/1965 Swiger et al.
(Continued)

FOREIGN PATENT DOCUMENTS

GB    2 191 089 A    12/1987

OTHER PUBLICATIONS

PCT International Search Report and Written Opinion of the International Searching Authority dated Oct. 14, 2016 for International Application No. PCT/US2016/040967 (16 pages).

*Primary Examiner* — Tan Le
(74) *Attorney, Agent, or Firm* — Fitch, Even, Tabin & Flannery, LLP

(57) ABSTRACT

The invention relates to a framed art hanging system for hanging pictures and other similar items such as art, photos, diplomas, posters, paintings and framed sports memorabilia on walls. The system allows the installer of a framed picture to easily hang the picture utilizing the combination of a magnetic connection and a mechanical connection. The magnetic connection is achieved by utilizing a magnet, preferably adhered to a plate which is attached to either the back of the picture frame or to the wall and a metal plate which is magnetically attracted to the magnet, the metal plate being placed on the other location (either the back of the picture frame or to the wall). Three example ways to achieve a mechanical connection are described. The first way is to place an abrasive coating on either the frame plate or the magnet plate and a deformable substance coating on the other. The second way is to combine fins and grooves, one being placed on the frame plate and the other being placed on the magnet plate. The last way is to utilize geometric protrusions and depressions, one being placed on the frame plate and the other being placed on the magnet plate.

6 Claims, 13 Drawing Sheets

(51) Int. Cl.
    *A47G 1/16*     (2006.01)
    *A47G 1/17*     (2006.01)
    *F16B 1/00*     (2006.01)

(52) U.S. Cl.
    CPC ............... *F16B 2001/0021* (2013.01); *F16B 2001/0035* (2013.01)

(58) Field of Classification Search
    USPC .... 248/467, 476, 489, 544, 686, 206.5, 683, 248/309.4, 300, 301
    See application file for complete search history.

(56) References Cited

U.S. PATENT DOCUMENTS

| | | | |
|---|---|---|---|
| 4,336,293 A | 6/1982 | Eiden | |
| 4,875,654 A | 10/1989 | Chandonnet et al. | |
| 4,912,864 A | 4/1990 | Price | |
| 5,269,083 A * | 12/1993 | Vampatella | A47G 1/065 248/206.5 |
| 6,742,295 B2 | 6/2004 | Gross | |
| 7,275,334 B2 | 10/2007 | Horst | |
| 7,430,824 B1 | 10/2008 | Ngan | |
| 7,934,330 B2 | 5/2011 | Nicolaisen | |
| 8,397,411 B2 * | 3/2013 | Russo | A47G 1/17 248/467 |
| 8,434,730 B2 * | 5/2013 | Ahlstrom | A47G 1/168 248/206.5 |
| 9,284,937 B2 * | 3/2016 | Smith | F01L 1/344 |
| 2004/0111944 A1 | 6/2004 | Gatt et al. | |
| 2008/0120865 A1 * | 5/2008 | Smith | F26B 25/18 34/239 |
| 2012/0275633 A1 * | 11/2012 | Schreiber | H04R 1/08 381/361 |

\* cited by examiner

FRAMED ART HANGING SYSTEM UTILIZING A MAGNETIC CONNECTION COMBINED WITH A MECHANICAL CONNECTION

FIELD OF THE INVENTION

The present invention relates to a system for hanging pictures and other similar items such as art, photos, diplomas, posters, paintings and framed sports memorabilia on walls. The system allows the user to easily hang pictures utilizing a magnetic connection combined with a mechanical connection without utilizing any hooks or wires and without requiring the user to precisely measure the location because the system permits easy adjustment of the height and location after hanging.

BACKGROUND OF THE INVENTION

In the past most installers of framed pictures have hung pictures and similar items by nailing a picture hanger or simply a nail or screw into the wall. The back of the picture typically had a braided wire or hanger bracket which was attached to the picture frame by a second series of screws or screw in eye hardware. Thereafter, the braided wire (now attached to the picture) or hanger bracket was placed over the picture hanger, nail or screw which protruded outward from the wall. This method was time consuming and it can produce disappointing results for example if the frame tilts. Also, it is impossible to adjust the height of the picture without rehanging either the braided wire or hanger bracket or moving up or down the location of the picture hanger, nail or screw or both.

In an attempt to simplify the process, workers in the art have tried other alternatives such as using magnets to attach the framed artwork to a wall. Examples of these attempts include the following U.S. Pat. Nos. 4,875,654, 7,934,330, 8,397,411 and UK Patent Application 2 191 089. Another improvement utilizing non-metallic means was described in U.S. Pat. No. 7,275,334 where the inventor utilized a fastener position indicator spot for indicating a desired location for placing a fastener on the wall surface to hang the picture.

SUMMARY OF THE INVENTION

The present invention relates to a framed art hanging system utilizing the combination of a magnetic connection and a mechanical connection which has the following advantage: it allows the user to easily make minor adjustments to the height and position of the framed art after it has been hung. The invention uses a strong magnet which is attached to either the back of the framed art or to the wall in combination with a steel plate which is attached to the other position (back of the framed art or to the wall). In addition to the magnetic attraction achieved between the magnet and the steel plate, the present invention supplements the strength of the attachment by also including a mechanical connection. The mechanical connection can include the placement of an abrasive substance and a deformable coating, one being placed on the magnet, the other being placed on the steel plate in the area where the magnet contacts the steel plate. This greatly strengthens the holding power of the system leading to less accidental failures in which the framed art can fall off the wall and sustain damage. Alternatively, a mechanical connection can be achieved by the placement of fins and corresponding grooves, one being placed on the steel plate while the other being placed next to the magnet. Alternatively, a mechanical connection can be achieved by creating small raised geometric protrusions on the surface of either the wall plate or the frame plate with corresponding shaped geometric depressions on the other plate (wall plate or frame plate). The geometric protrusions and corresponding depressions can be of any shape that facilitates making a mechanical connection between the two plates and can include, but is not limited to circles, hemispheres, squares, rectangles, pyramids and the like. The size can also be varied to achieve the desired benefit of creating a mechanical connection while simultaneously being small enough to allow easy relocation of the framed art to make minor changes in the position of the framed art on the wall.

Regardless of the type of mechanical connection which is utilized, in another embodiment, there is incorporated in the system an indicator spot which tells the user where either the wall plate should be adhered to the wall thereby facilitating installation.

DETAILED DESCRIPTION OF THE INVENTION

Figure 1:
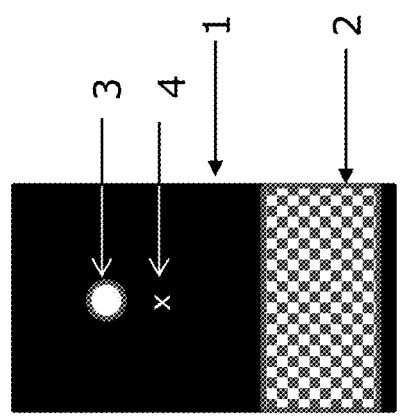
FIG. 1 shows a depiction of the wall plate having attached thereto a magnet.

The present invention relates to a framed art hanging system utilizing the combination of a magnetic connection and a mechanical connection. The system can be used to hang pictures or other similar items such as art, photos, diplomas, posters, paintings and sports memorabilia items or similar items on walls or other vertical areas such as the sides of file cabinets, refrigerators and other similar places. In the present invention disclosure, the art which is hung will be referred to as framed art or framed pictures but it is understood that the invention can be utilized with the other items discussed above with similar beneficial results. In like fashion the vertical area shall be referred to as the wall, but it is understood that the system can be utilized with the hanging of framed art on other vertical surfaces.

The invention requires the use of a magnet and a frame plate. The magnet is made up of a magnet either alone or more typically in combination with a metal backing plate. Preferably the magnet is attached to a larger steel plate, the attachment preferably being by glue or other adhesive. The frame plate, by contrast, is larger in size than the magnet plate and is made up of a magnetically attractive steel material. The larger frame plate allows for minor modifications in location of the framed art to be made after the magnet plate is in contact with the frame plate thereby hanging the picture onto the wall. The magnet plate can be either attached to the wall or to the back of the picture frame, typically to the upper portion. In like manner the frame plate may be attached to the wall or to the upper portion of the picture frame. During the present invention disclosure which follows, the magnet plate is attached to the wall and is also referred to as the wall plate and the frame plate is attached to the upper portion of the back of the picture frame but it is to be understood that the plates can be utilized in the other position with the same benefits being achieved.

The magnets which are part of the framed art hanging system can be any type of magnet but it is preferable to use magnets of the type called Neodymium because these magnets belong to the strongest group of magnets commercially available in the marketplace. The size and strength of magnet can be varied depending on the overall system strength needed to achieve a particular desired result. One skilled in the art will readily understand how to select a magnet of appropriate strength and size to optimize the total system of magnet and mechanical connection of the present invention.

An important aspect of the present invention is the fact that a mechanical connection is utilized in addition to the magnetic attraction between the magnet plate and steel plate thereby strengthening the holding power of the framed art hanging system. The mechanical connection can be achieved by one of several different means.

In one embodiment, a deformable coating is applied to the surface of either the steel frame plate or magnet surface and the other surface (frame plate or magnet surface) contains an abrasive substance on its surface, it being understood that the surfaces containing the added substances are the surfaces of the magnet plate that is in direct contact with the frame steel plate. The mechanical connection that results is much greater than the connection which results from the contact between an uncoated magnet plate surface in contact with an uncoated steel frame plate surface. The mechanical connection is also much greater than that which occurs when one of the two surfaces is coated with either the abrasive substance or a deformable coating only. In the case where only one surface is coated or when both surfaces are coated with the same material, simple static friction is achieved.

In another embodiment the mechanical connection is achieved by the incorporation of one or more fins and corresponding grooves to accept the insertion of the fin(s), the fin or fins being placed on either the surface of the steel plate or the magnetic plate and the groove or grooves being placed on the other surface (steel plate or magnet plate).

In yet another embodiment, the mechanical connection is achieved by creating small raised geometric protrusions on the surface of either the wall plate or the frame plate with corresponding shaped geometric depressions on the other plate (wall plate or frame plate). The geometric protrusions can be of any shape that facilitates making a mechanical connection between the two plates and can include, but is not limited to circles, cylinders, hemispheres, squares, rectangles and pyramids. The size can also be varied to achieve the desired benefit of creating a mechanical connection while simultaneously being small enough to allow easy relocation of the framed art to make minor changes in the position of the framed art on the wall.

As is readily known by those skilled in the art, a mechanical connection is the joining of two or more elements by mechanical fasteners but not by non-mechanical means such as adhesives. Classically, examples of mechanical fasteners include bolts, rivets, or screws. It is well understood that the mechanical connection can be either temporary or permanent. In one embodiment of the present invention, a mechanical connection is created by embedding an abrasive substance into a deformable coating at the interface between the magnet and the magnetically attractive plate. The embedded abrasive substance thereby performs the same function and role of a classical mechanical fastener such as a bolt or screw by providing resistance to movement of the two connected elements relative to each other. Alternatively the mechanical connection can be achieved the by connection of fins and grooves or by connection of raised geometric protrusions and depressions.

Critically, the combination of a magnetic connection supplemented with a mechanical connection allows the user to easily adjust the location of the framed art after hanging it on the wall without the difficulties encountered using classical mechanical connections alone while also increasing the weight that can be supported and greater assurance that the framed art will not accidently fall compared to use of a magnetic connection alone.

In the present invention, a magnetic connection is defined by the force created by a magnet being placed in close enough proximity to a magnetically attractive material such that a measurable opposing force is required to increase the distance between the magnet and the magnetically attractive material. In the intended configured use of the present invention, namely to hang framed art on a substantially planer surface that is perpendicular to the force of gravity, the magnetic connection primarily provides force to attract the artwork toward the wall.

The second critical element of the invention is the use of a mechanical connection. This connection primarily provides force to oppose gravity and keep the framed art from falling to the floor. The mechanical connection is created by utilizing one material embedded into or resting on top of another material configured such that it provides resistance to force applied laterally to the magnetic connection, such as gravity, when the framed art is placed on a substantially planer surface that is perpendicular to the force of gravity. As a result of this configuration, the mechanical connection becomes effective and incremental to the magnetic connection only when the framed artwork is subjected to a force partially or substantially perpendicular to the magnetic connection such as when the framed art is hung on a wall.

The mechanical connection of the invention is preferably not tightly fitting and can easily be removed by the frame installer without tools or other special devices or training. This facilitates easy consumer use of the invention. Importantly, a significantly stronger magnet would be required to simultaneously secure the framed art to the wall and to oppose the force of gravity if a magnet were used alone to create the magnetic connection without the benefit of a mechanical connection.

Regardless of the means of achieving a mechanical connection, the mechanical connection supplements the force created by a magnet alone and creates an improved system to hang framed art over the use of a magnet supplemented with friction alone.

Critically, the combination of using a magnet supplemented with a mechanical connection maintains the ability to adjust the placement of the framed art after hanging it on the wall.

As with classical mechanical fasteners, the connection of the two elements can be intentionally removed by, for example, removing the bolt or screw. In the present invention, the mechanical connection can similarly be intentionally removed by applying a force opposite of the force that is forcibly embedding the abrasive substance into the deformable coating or by disconnecting the fin(s) from the groove(s). Also, as with a classical mechanical fastener, the connection of the two elements can be unintentionally lost by, for example, applying too much force causing the bolt to break or the screw to be pulled out of the material it is fastened into. In the present invention, the mechanical connection can similarly be unintentionally lost by applying too much force such that the deformable coating yields and is stripped away due to the applied force as the abrasive material slides across the surface the deformable coating it is applied to. The mechanical connection can be lost if the installer of the hanging art pulls the picture outward at the bottom front part of the picture frame. In the case of the groove and fin combination or the raised geometric protrusion and depression connection, the connection is lost by, for example, if too much external force applied resulting in the failure of the mechanical connection.

In the present invention, the mechanical connection can be characterized by the following elements: an abrasive substance that is secured to one surface such as a magnet on the magnet plate; a deformable coating that is secured to a second surface such as a steel plate; the abrasive substance is then forcibly embedded into the deformable coating that is applied to a second surface that in turn accepts the abrasive substance.

For purposes of the present invention a deformable coating is any coating that is applied to a hard surface (such as the frame plate or wall plate) that exhibits the ability to accept embedding of a small hard particle(s) into it. The deformable coating can be applied by any number of methods including, but not limited to, spray or brush application. Examples of deformable coatings include, but are not limited to, rubberized sealants, soft plastic and latex rubber. The thickness of the deformable coating should be between about 100 microns and about 500 microns. Too small a coating will be insufficient to accept embedding and therefore not form a mechanical connection and too thick of a coating dramatically reduces the strength of the magnetic attraction between the magnet and the steel plate.

An abrasive coating substance is any material comprised of discrete particles that are harder than a deformable coating. Examples of abrasive substances include, but are not limited to sand, ground glass, ground stone and metal shavings. The abrasive coating can be applied with glue or any similar adhesive as well as any other means that permanently secures it to the surface of the plate. The layer of the abrasive coating should be between about 75 microns and about 1000 microns. Too small of an abrasive coating will be insufficient to embed into the deformable coating to form a mechanical connection and too thick of a coating will dramatically reduce the strength of the magnetic attraction between the magnet and the steel plate.

Referring now to FIG. 1, there is depicted a magnet wall plate 1 which is made up of a 16 ga (0.06 inch thick) steel plate of an approximate size of 1×3 inches to which is attached a Neodymium magnet 2. The magnet has the following properties; it is grade N42, made up of NdFeB, and it contains a surface field of 3723 Gauss. The size of the magnet is 0.5"×0.25"×0.125" and it was securely glued to the 16 ga (0.06 inch thick) steel plate. The combination of the magnet glued to the steel plate constitutes the magnet wall plate. The side of the magnet that will eventually contact the frame plate was coated with an abrasive substance, namely fine sand of an approximate size of 170 microns, the sand was applied to the surface of the magnet by glue. Metal wall plate also contains a hole 3 through which a screw passes (not shown) to attach the wall plate to the wall.

Figure 2:
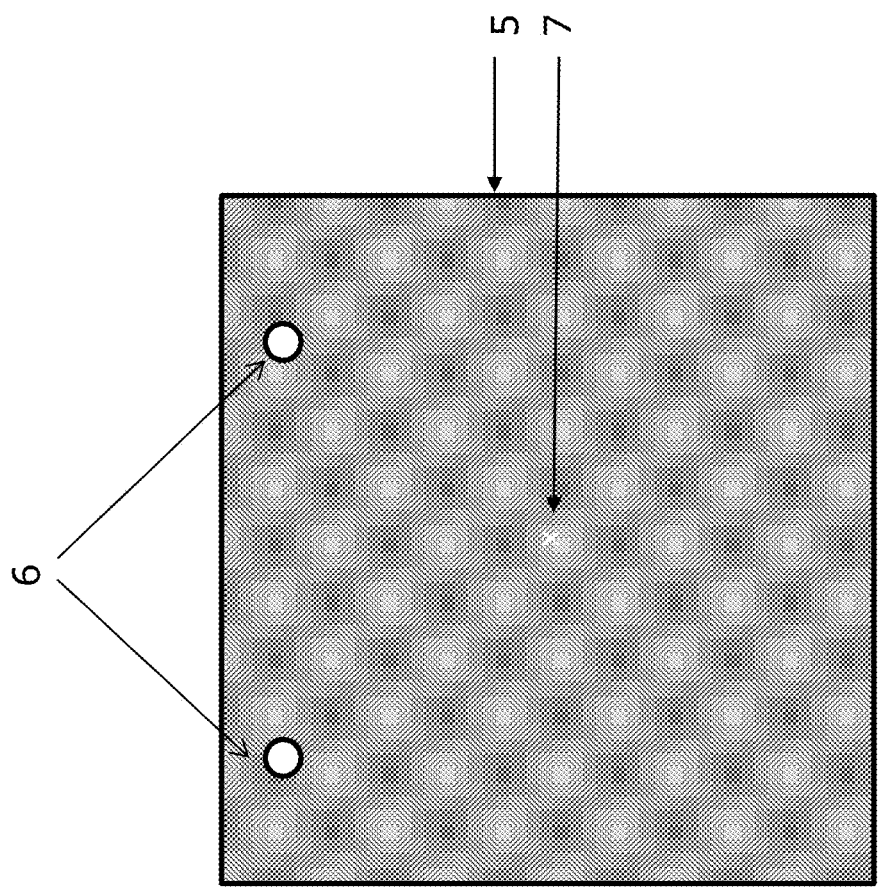
FIG. 2 shows a depiction of the steel plate which in this instance is attached to the top, back of the framed art.

Referring to FIG. 2 there is depicted a metal frame plate 5 of an approximate size of 3×3 inches made of a metallic material which will be attracted to a magnet. In this instance the metal frame plate is constructed of steel. The steel frame plate was coated with a deformable coating, namely flexible rubber coating which was sprayed on the outer surface of the plate that will eventually contact the magnet wall plate. In this instance the steel frame plate was sprayed with Rust-Oleum Leak Seal manufactured by Rust-Oleum Corporation of Vernon Hills, Ill. The metal frame plate coated with the deformable coating was attached to framed art 8 (shown in FIG. 3) by securing the plate 5 with two screws (not shown in FIG. 2) through the holes 6. When correctly attached, the metal frame plate will be attached to the top, rear of the framed art slightly below the top boundary of the frame art. This is preferred so as not to permit the viewing of the metal frame plate after the framed art is hung on the wall.

Figure 3:
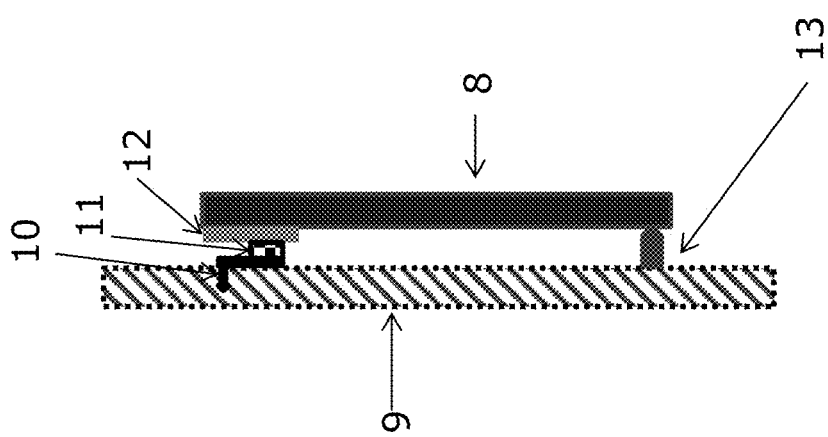
FIG. 3 is a profile view of the framed art which is attached to a frame metal plate, which in turn is attached to a magnet metal wall plate, the magnet metal wall plate is secured into a wall with a screw.

Referring to FIG. 3 there is depicted a profile view of the hung framed art 8. The metal frame plate 12 is secured to the top, rear of the framed art 8. The metal frame plate 12 with the deformable coating was attached to the magnet 11 secured to the magnet wall plate. The magnet 11 with the abrasive fine sand attached thereto contacted the deformable coating on the outside of the metal frame plate 12. The magnet wall plate is secured to the wall 9 using a screw 10 which traveled through hole 3 in the magnet wall plate. Also shown in FIG. 3 is a bumper 13 which can optionally be attached to the bottom of the framed art 8. The thickness of bumper 13 is the approximate size of the total thickness of the magnet 11 and frame plate 12. To get a professional look for the hung framed art, the bumper keeps the art basically parallel to the wall without any sag or tilt. It also provides the benefit of maintaining the full surface of the magnet 11 on the frame plate 12.

Figure 4:
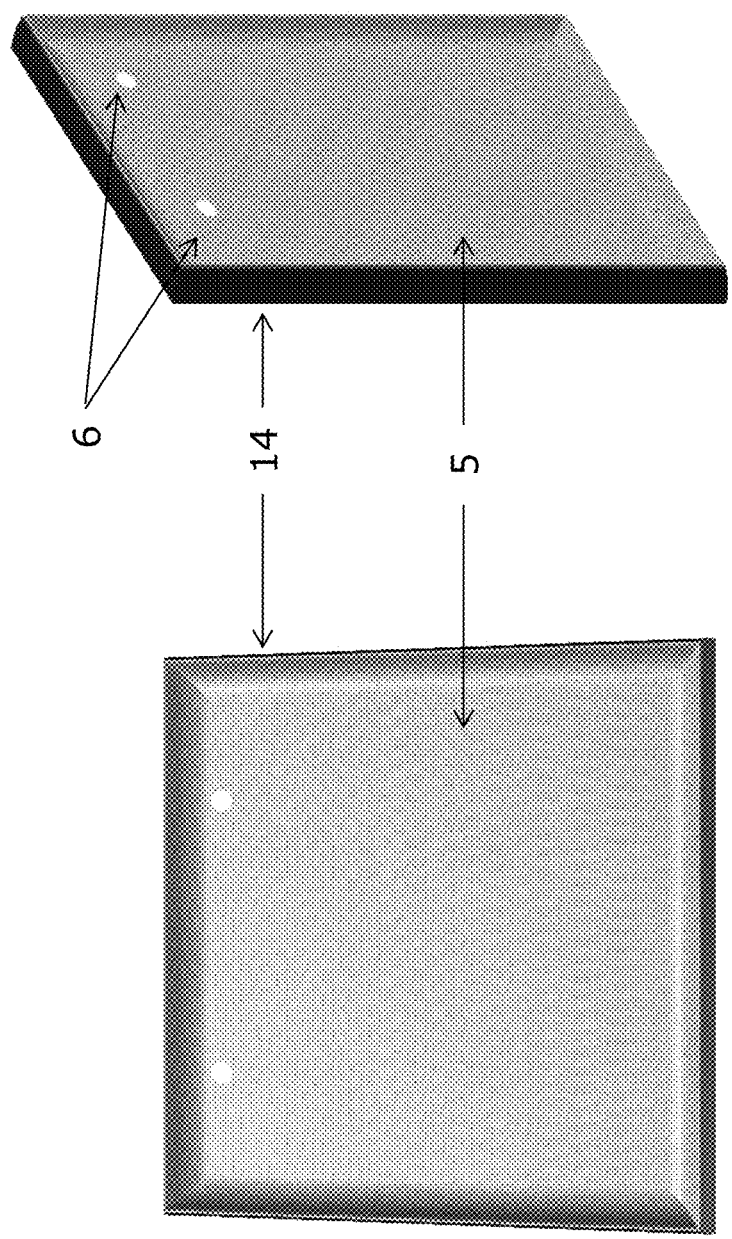
FIG. 4 is a steel frame plate which contains a flange extending around the entire outer boundary of the frame plate.

Referring to FIG. 4, there is depicted a metal frame plate 5 similar to that set forth in FIG. 2. The metal frame plate contains two holes 6. Screws, not shown, will pass through the holes and will attach the metal frame plate into the top, rear of the framed art. The metal frame plate in FIG. 4 additionally contains a flange 14 around the entire exterior of the metal frame plate. When the installer places the metal frame plate with the framed art attached thereto onto the magnet which is attached to the metal wall plate, the flange has the additional advantage to guide the installer where to place the metal frame plate. After placing the framed art onto the magnet, the installer can make adjustments to the location of the framed art as long as the magnet, which extends outward from the metal wall plate (see FIG. 3), stays within the outer boundaries of the flange enclosed metal frame plate.

Figure 5:
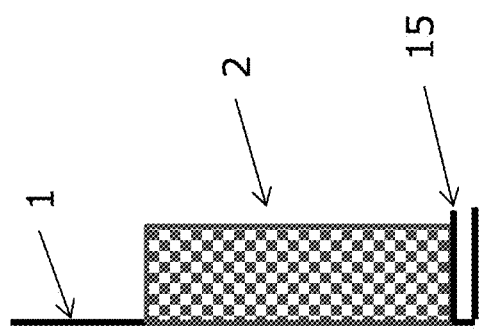
FIG. 5 is a wall plate containing a magnet and one or more fins.
Figure 6:
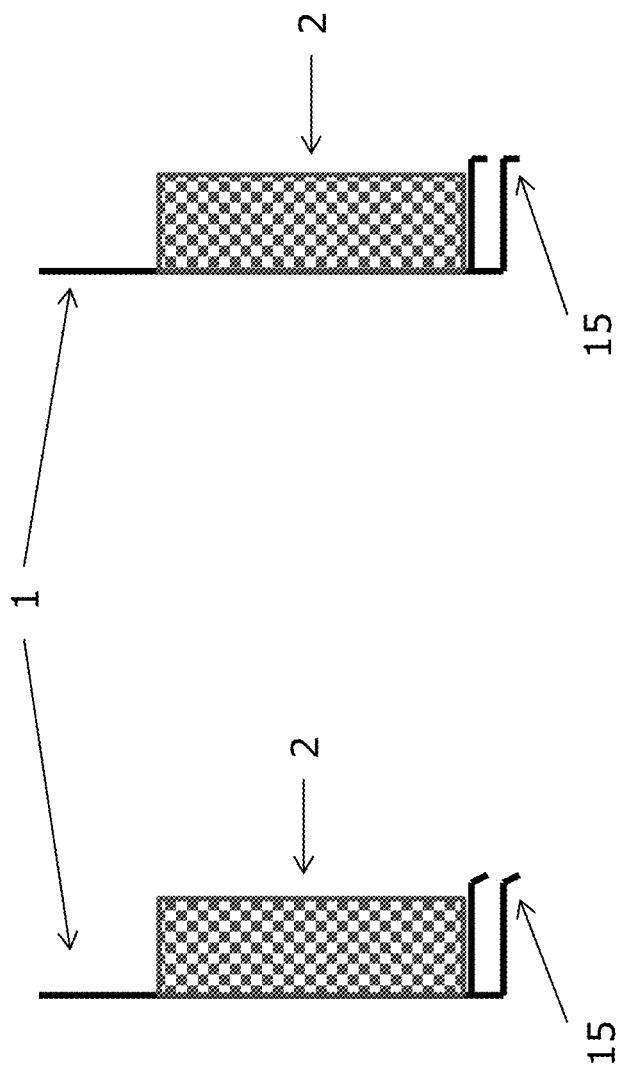
FIG. 6 is a wall plate containing a magnet and one or more fins having an alternate design being either angled or square.
Figure 7:
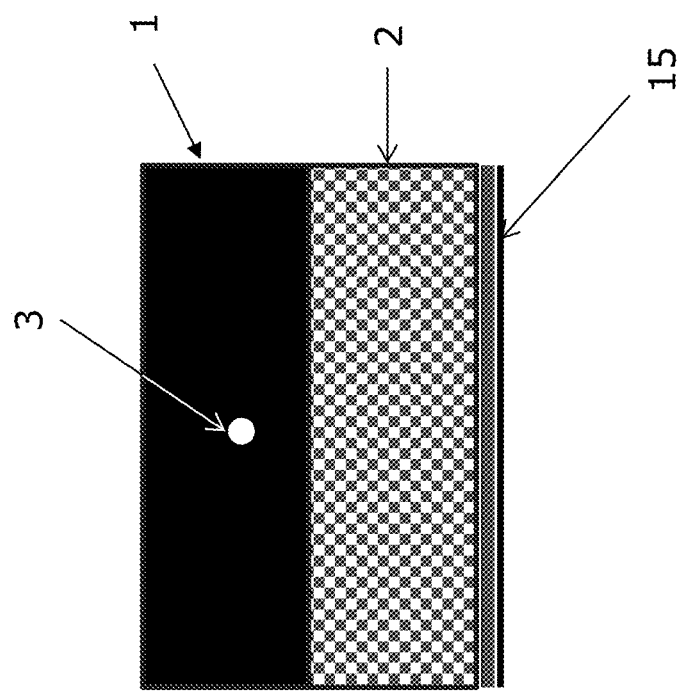
FIG. 7 is a top view of a magnet wall plate having one or more fins.
Figure 8:
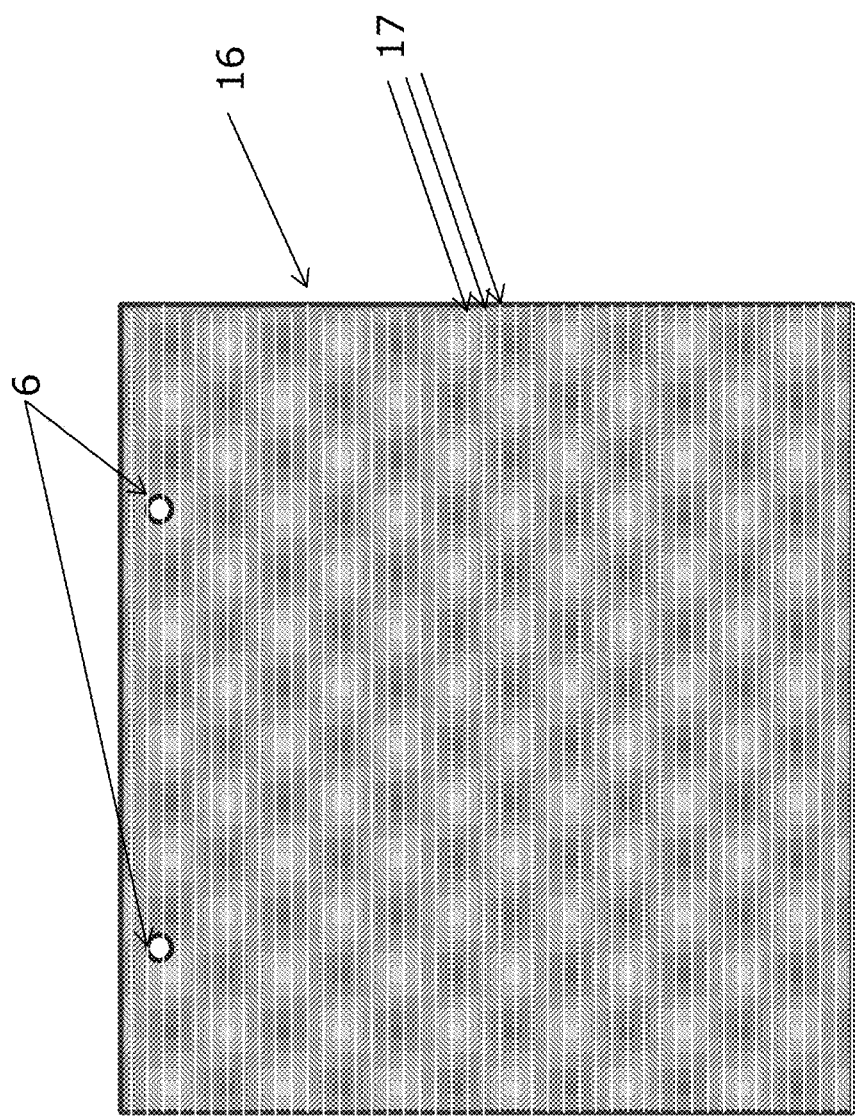
FIG. 8 is a top view of a frame plate having incorporated therein one or more grooves adapted to receive the fins from the magnet wall plate.
Figure 9:
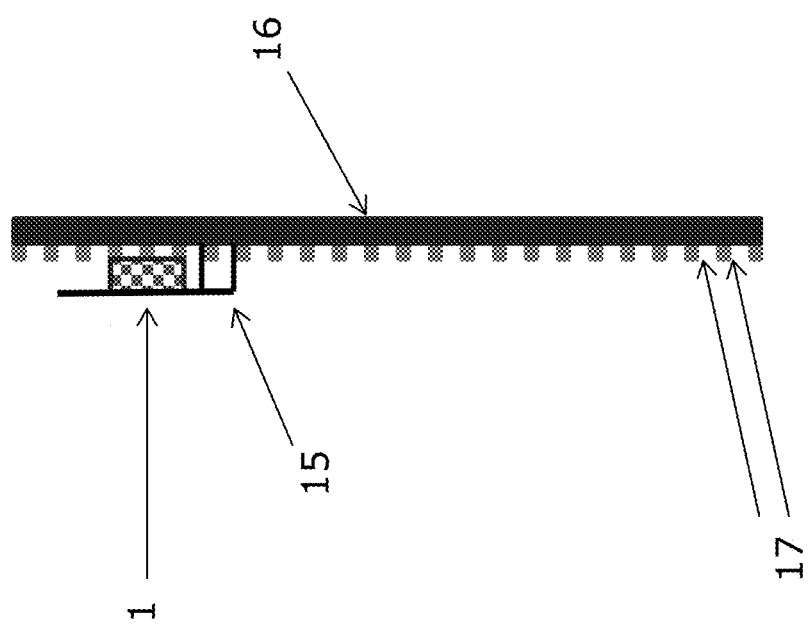
FIG. 9 is a profile view of the magnet wall plate with fins attached to the steel frame plate having a series of grooves.

Referring to FIG. 5 is shown a magnetic wall plate 1 wherein the magnet 2 is glued to a steel wall plate. There is also incorporated in the wall plate one or more fin(s) 15 which protrudes outward a distance in excess of the magnet. FIG. 6 shows a magnetic wall plate 1 similar to the one shown in FIG. 5 with the difference being that the protruding fins 15 are in one instance an angled key edge and in the other instance the fins contain a square key edge. FIG. 7 shows a top view of the magnetic wall plate with a hole 3 through which a screw will be utilized to secure the magnetic wall plate to the wall. The magnetic wall plate 1 contains a magnet 2 which is attached to a steel plate by an adhesive. The magnetic wall plate also contains one or more fins under the magnet and which protrude a distance further than the magnet such that they will be able to be attached to the grooves embedded in a steel frame plate. FIG. 8 shows a top view of a steel frame plate 16 containing a number of grooves 17. The grooves have a depth ranging from about 25 microns to about 1000 microns and a spacing of about 500 microns to about 5000 microns. When the installer utilizes the grooved steel frame plate it is easier to mate the fins inside of the grooves and if the installer wishes to modify the height or location of the picture, it is very easy to disconnect the fins from the grooves and reconnect the framed picture to the magnet wall plate after repositioning it to the desired height. FIG. 9 is a profile view of a magnet wall plate with fins 15 attached to a steel frame plate containing a larger number of grooves 17.

Figure 10:
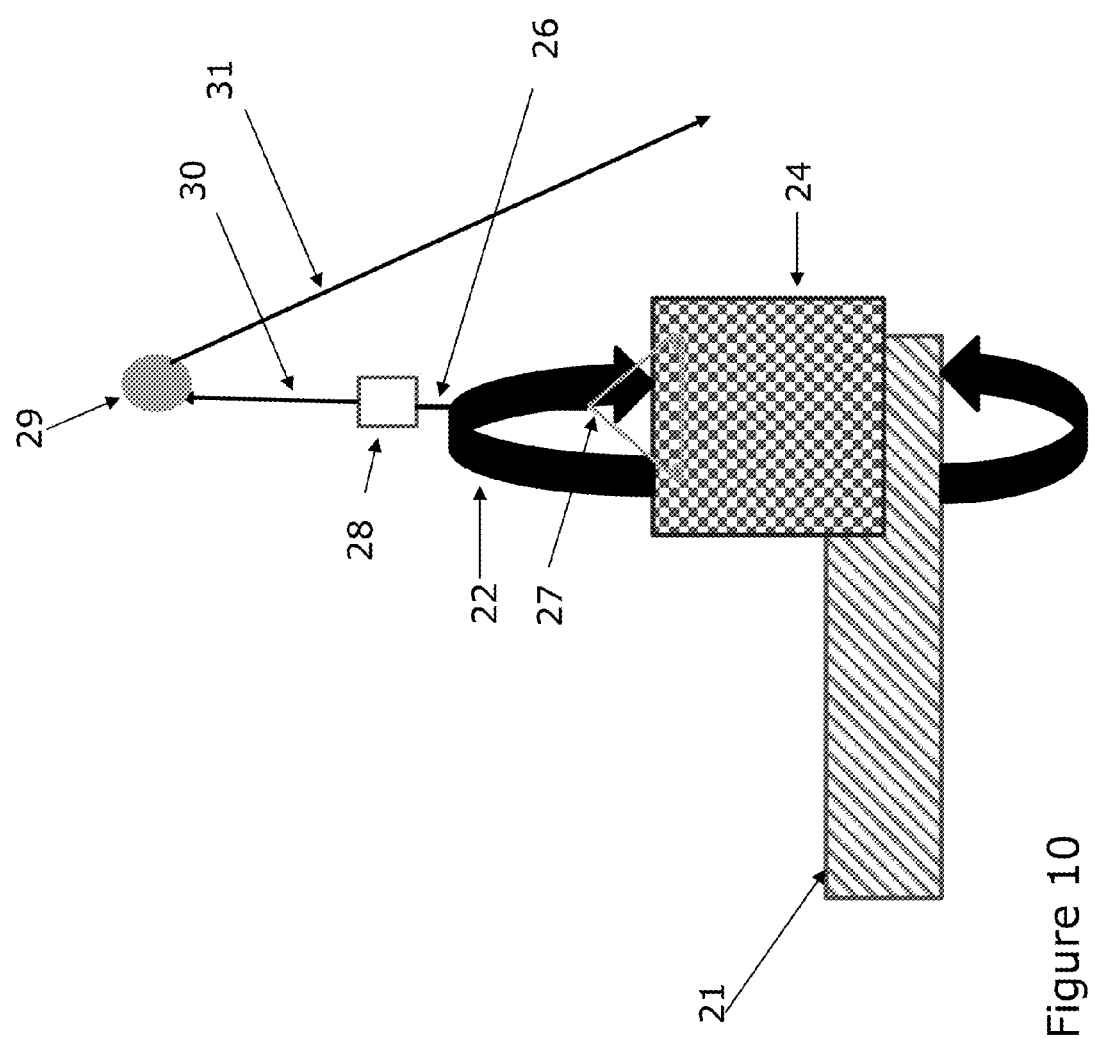
FIG. 10 is a front view of an experimental apparatus utilized by the present inventor to measure the strength of the connection which results when the frame plate contacts the magnet wall plate.
Figure 11:
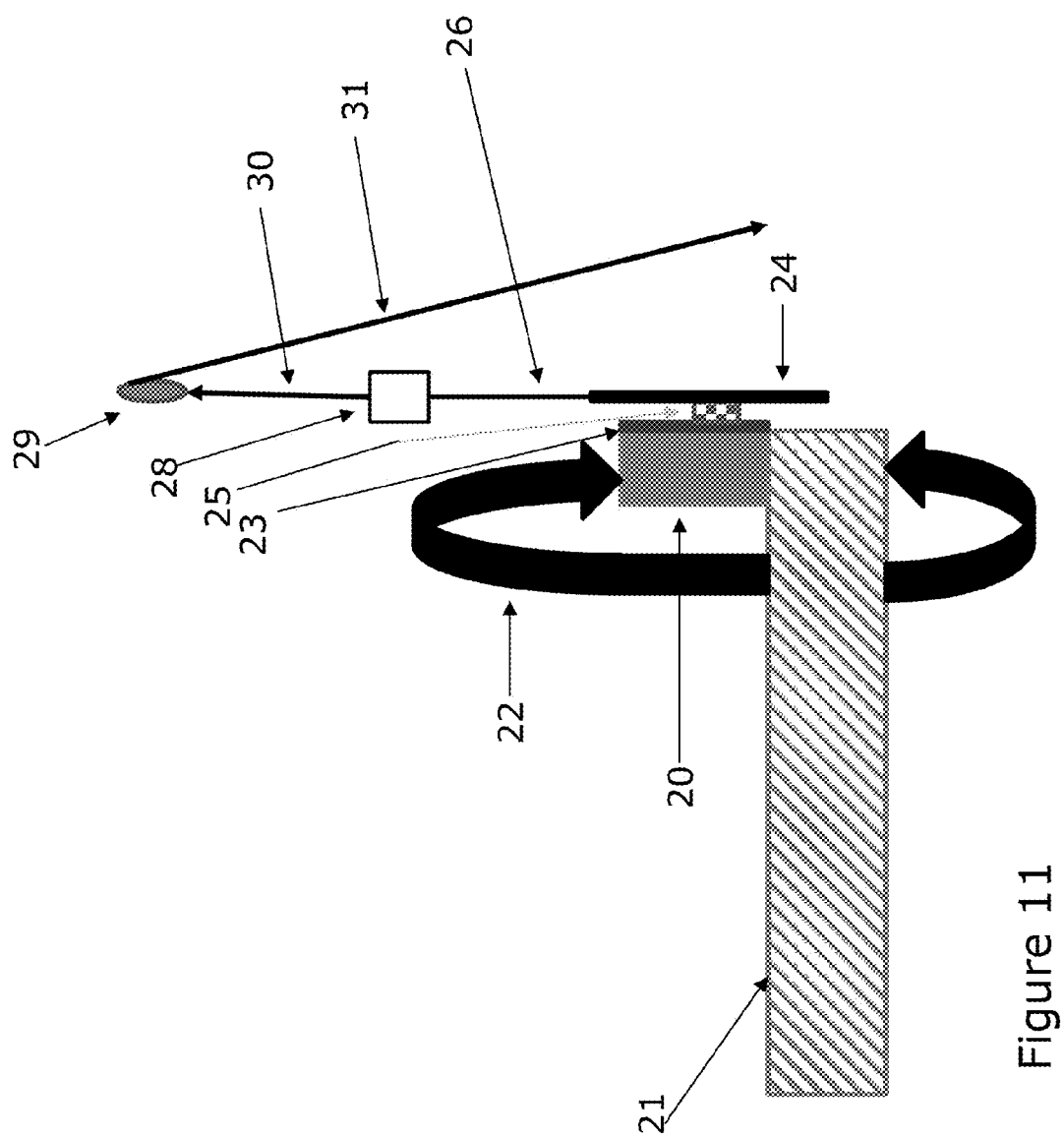
FIG. 11 is a profile view of the experimental apparatus previously outlined in FIG. 10.

In the comparison Examples which are set forth below, an experimental apparatus shown in FIGS. 10 and 11 was developed to assess different materials to create and optimize the coefficient of static frictional force between the magnet and the steel frame plate. In all examples, the apparatus shown in FIGS. 10 and 11 is used to measure the force required to forcibly move the metal frame plate latterly across the magnet.

In using the apparatus, a block of wood 20 (shown in FIG. 11) is used to represent a vertical wall. The wood is secured to a workbench 21 by means of a "C-clamp" 22. The wall plate 23 with magnet 25 attached by adhesive glue is removably attached to the block of wood 20 using a standard wood screw not shown that is passed through a hole drilled through the wall plate 23. The metal frame plate 24 is placed against the magnet 25 such that the steel frame plate is magnetically attracted and attached to the magnet. The magnet is intentionally placed approximately in the center of the frame plate 24. A small diameter rope 26 is passed through two holes that are drilled through the top of the frame plate 24. The ends of the small diameter rope 26 are joined using any number of approaches with the simplest being a secure knot.

Enough slack is left in the small diameter rope 26 to allow it to form a triangle 27 when the center is pulled directly upward by means of a second rope 30. This rope 30 is attached to an electronic digital scale 28. Any number of possible manufacturers of such scales exist. In the examples of the present invention, a "MANGO SPOT" LCD Electronic Balance Digital Fishing Hook Hanging Scale with a capacity of 110 pounds was used. The top handle of the electronic digital balance is then attached to a third rope 31 that is passed across a pulley 29 where the pulley is mounted directly above the location of the magnet 25 and frame plate 24 combination.

The individual conducting the experiment can then easily pull downward on the third rope 31 to create an upward force on the frame plate 24 while simultaneously watching the digital display of the electronic digital balance 28 to identify the precise upward force that is required to create slip of the frame plate 24 upward and lateral to the secured magnet 25. The amount of force required to overcome either the coefficient of static friction or the force required to break the mechanical connection created by the present invention is measured and reported in the comparison examples reported below.

COMPARISON EXAMPLES

The applicant compared the framed art hanging system where the magnet wall plate was coated with the abrasive coating of fine sand and the metal frame plate was coated with a deformable coating, namely the flexible coating, with other systems where the two coating were not utilized, or where only one coating was utilized or where coatings that do not meet the requirements of the invention when applied. In each instance, utilizing the experimental apparatus described above, the average measured force required to create slip was compared. The results are reported below. In each of the experiments the same magnet was used as was reported above and the same steel frame plate was utilized.

Comparison Example 1

In the first set of experiments coatings were applied to the magnet and to the steel frame plate as described below.

| Coating on Magnet | Coating on Steel Frame Plate | Average Measured Force Required to Create Slip (lbs.) | Percent Improvement vs Uncoated Steel and Magnet | Primary Type of Slip Force Demonstrated |
|---|---|---|---|---|
| None (other than the Nickel on the Magnet) | Uncoated Steel | 1.8 | NA | Simple Static Friction |
| None | Flexible Rubber Coating RUST-OLEUM LEAK SEAL | 2.9 | 61% | Simple Static Friction |
| Fine Sand | Flexible Rubber Coating RUST-OLEUM LEAK SEAL | 8.7 | 383% | Mechanical |
| 150 Grit Sandpaper | Flexible Rubber Coating RUST-OLEUM LEAK SEAL | 9.8 | 444% | Mechanical |

In this example, the invention is demonstrated by the substantial improvement in force required to create slip or movement between the sand coated magnet and the deformable material coated frame plate. In this example, an additional 5.8 pounds and 6.9 pounds of force are needed to create slip between the magnet and the frame plate compared to the force required to overcome the coefficient of static friction created by the example of uncoated magnet and flexible rubber coating alone on the steel frame plate or where both the magnet and steel frame plate were uncoated.

Comparison Example 2

Another set of experiments were conducted.
Coatings were applied to the magnet and to the steel frame plate as described below.
Fine sand of mean diameter about 170 microns.
Paint primer coating of about 15 microns.
Flexible rubber coating of about 150 microns.
3M Rubberized Automobile Undercoating (manufactured by 3M Company of St. Paul, Minn.) coating of about 150 microns.

| Coating on Magnet | Coating on Steel Frame Plate | Average Measured Force Required to Create Slip (lbs.) | Percent Improvement vs Uncoated Steel and Magnet | Primary Type of Slip Force Demonstrated |
|---|---|---|---|---|
| None | Uncoated Steel | 3.0 | NA | Simple Static Friction |
| Fine Sand | Paint Primer RUST-OLEUM AMERICAN ACCENTS | 5.1 | 70% | Simple Static Friction |
| Fine Sand | Flexible Rubber Coating RUST-OLEUM LEAK SEAL | 11.3 | 276% | Mechanical |
| Fine Sand | 3M Rubberized Automobile Undercoating | 10.9 | 263% | Mechanical |

This example demonstrates that a mechanical connection between the sand coated magnet and the deformable material coated frame plate was created with two different types of deformable material. Both deformable materials share the same property of being deformable and accepting of embedding the abrasive sand material into the deformable coating of the frame plate. Similar results were obtained using both deformable materials and the results were a significant increase in force required to create slip compared to the force required to create slip where only static friction of either uncoated magnet or fine sand is forced to slip on uncoated steel or primer coated steel.

Comparison Example 3

To demonstrate the novelty of the present invention and to demonstrate the difference between overcoming simple static friction and creation of a mechanical connection between the coating of the magnet and the coating of the frame plate, another experiment was conducted. In this example, fine sand was applied to both the magnet and to the frame plate. In this situation, the sand cannot embed into a deformable coating. The coatings of hard sand can only sit on top of each other sandwiched between the magnet and the frame plate.
Fine sand of mean diameter about 170 microns
Paint primer coating of about 15 microns
Coatings were applied to the magnet and to the steel frame plate as described below.

| Coating on Magnet | Coating on Steel Frame Plate | Average Measured Force Required to Create Slip (lbs.) | Percent Improvement vs Uncoated Steel and Magnet | Primary Type of Slip Force Demonstrated |
|---|---|---|---|---|
| None | Uncoated Steel | 3.0 | NA | Simple Static Friction |
| Fine Sand | Fine Sand | 4.8 | 60% | Simple Static Friction |
| Fine Sand | Paint Primer RUST-OLEUM AMERICAN ACCENTS | 5.1 | 70% | Simple Static Friction |

As can be observed from the results of this experiment, the measured amount of force required to create slip between the sand coated frame plate and the sand coated magnet is consistent with just the static friction between the two coated surfaces. Furthermore, no evidence of deep scratches representing the embedding of one material into the other was observed after the sand coated frame plate was forced to move parallel to the sand coated magnet.

Comparison Example 4

As someone skilled in the art will readily appreciate and understand, there is a limit to the benefit achieved from increasing the size of the abrasive substance or the thickness of the deformable coating applied to either the magnet or the frame plate.
It is well understood that the strength of a magnet decays approximately with the cube of the distance between the magnet and a magnetically attractive material such as steel or another magnet.
Because of this fact, the mean particle size of the abrasive substance as well as the thickness of application must be optimized to achieve the maximum mechanical connection while minimizing the distance between the magnet and the steel plate. Similarly, the thickness of the deformable coating must be maximized to achieve an effective mechanical connection while minimizing the distance between the magnet and the steel plate.
Fine sand of mean diameter about 170 microns
Course sand of mean diameter about 1300 microns
Flexible rubber coating of about 150 microns
Coatings were applied to the magnet and to the steel frame plate as described below.

| Coating on Magnet | Coating on Steel Frame Plate | Average Measured Force Required to Create Slip (lbs.) | Percent Improvement vs Uncoated Steel and Magnet | Primary Type of Slip Demonstrated |
|---|---|---|---|---|
| None | Uncoated Steel | 3.0 | NA | Simple Static Friction |
| Fine Sand | Flexible Rubber Coating RUST-OLEUM LEAK SEAL | 11.3 | 276% | Mechanical |

-continued

| Coating on Magnet | Coating on Steel Frame Plate | Average Measured Force Required to Create Slip (lbs.) | Percent Improvement vs Uncoated Steel and Magnet | Primary Type of Slip Demonstrated |
|---|---|---|---|---|
| Course Sand | RUST-OLEUM LEAK SEAL Flexible Rubber Coating | 6.2 | 106% | Mechanical Weakened by Distance Between Magnet and Steel Plate |

This example demonstrates that the additional thickness of the course sand material reduces the slip force required to move the deformable coated frame plate lateral to the abrasive coated magnet as a result of the increase in distance between the magnet and the steel frame plate. Those skilled in the art will readily understand how to optimization of the size of the abrasive material, the thickness of applied abrasive material and the thickness of the deformable coating to achieve the optimal combination to maximize the force opposing gravity on a frame mounted on a vertical wall while minimizing the size and strength of a magnet required to achieve an acceptable result.

In another embodiment of the invention, the art hanging system also includes an indicator spot for locating a desired area to secure the magnetic plate to the wall. In order to maximize the utility of the full size of the frame plate, it is desirable to center the magnet on the frame plate. This will allow the person installing the frame hanging system to maximize the utilization of the full size of the frame plate affixed to the back of the framed artwork. In order to do so, the person installing the system must know the approximate location to secure the wall plate on the wall.

A novel method is provided to give guidance to the frame installer on where to secure the wall plate to the wall. This method utilizes the transfer of a marking substance from the frame plate or the magnet wall plate to the wall. Instructions provided to the user indicate that the user is to apply a small amount of colorant to the specified location indicated on the frame plate. The colorant can be any of several choices including but not limited to common household items such as liquid paint, nail polish, or tooth paste. While not required, it's preferable to avoid use of lubricating colorants such as oil, moisturizer, or food stuffs. The ideal colorant is a viscous material that doesn't run when held vertical to the surface of the wall while simultaneously providing a clear and discernable color when applied to the wall where the framed art is to be mounted. In another embodiment, the installer removes a cover exposing a spot containing a colorant or marker apparatus. A person skilled in the art will quickly understand that the location of the color or texture difference marking on the frame plate depends on several factors including the distance between the mounting hole of the wall plate and the magnet, the desired final mounting location of the magnet or hanging hook, nail, or hole, and the geometry of the frame plate.

Alternatively, the location indicating marking can be on the wall plate. Again, the location can be marked using a color or texture difference or by using a spot containing a colorant or marker apparatus. Alternatively, the location can be indicated to the consumer based on a geographic location on the plate such as "just below the hole for the screw". A person skilled in the art could easily come up with several alternate ways to describe to the consumer the location to be marked with paint while still achieving utilizing and practicing the same novel method described herein.

In yet another embodiment, a protrusion from the wall plate or frame plate creates an imperfection on the wall when the wall or frame plate is firmly pressed against the wall. In yet another embodiment, the user is supplied with an item that has adhesive applied to both sides so it will temporarily adhere to the wall or frame plate but will preferentially adhere to the wall when pressed to the wall.

One example way that the indicator spot can be utilized to assist the end consumer in hanging a piece of framed art is as follows. The product supplied to the consumer can include a marking on the frame plate such as indicated by the marking x 7 shown in FIG. 2. The location is identified by a color or texture difference or text on the frame plate that is readily identified by the consumer. The marking is present on the side of the frame plate that will eventually be in contact with the magnet on the magnet wall frame plate.

The consumer installs the frame plate to framed picture and then applies a small amount of colorant to the location indicated by the color or texture difference on the frame plate. The colorant can be most any liquid or paste with enough viscosity that it will remain a bead or drop when the frame plate is positioned perpendicular to the direction of gravity. This viscous property keeps the colorant from simply dripping downward.

The consumer then positions the framed picture with the frame plate attached thereto on the wall approximately in the desired final installed location. Then, the consumer presses the framed artwork directly to the wall resulting in the transfer of the colorant from the frame plate to the wall. This location marks where the user should install a securing device such as a screw or nail through a hole in the magnet wall plate to attach the magnet wall plate to the vertical wall. The consumer then completes the installation by contacting the frame plate attached to the framed picture to the magnet wall plate. The magnet will grab and hold the framed picture in place. If the consumer/installer would like to move the frame picture a small distance, he or she should tap the frame with their hand or with a rubber mallet. If there is a desire to move the frame picture a greater distance it is recommended to pull the frame away from the wall and move it into the desired location.

In an alternative method utilizing the indicator spot, the consumer attaches the metal frame plate to the framed picture (as above). Then the consumer places the magnet wall plate to the metal frame plate. In this embodiment the magnet wall plate either has a pre-marked area shown in FIG. 1 as the x indicated by 4 on the rear of the wall plate to which the consumer will apply a drop of colorant. Alternatively, the consumer will apply a drop of colorant just above the hole in the magnet wall plate. Thereafter the consumer places the framed picture with the framed plate and magnet wall plate attached thereto to the desired location on the wall and presses up against the wall to transfer the colorant to the wall. The installation is completed by removing the magnet wall plate from the frame plate, attaching the magnet wall plate to the wall in the area indicated by the transferred indicator spot and finally the framed picture (with frame plate attached) is placed onto the magnet which is now attached to the wall. The force of the magnet will hold the framed picture in place and if the consumer wants to reposition the framed picture the directions above should be carried out.

Figure 12:
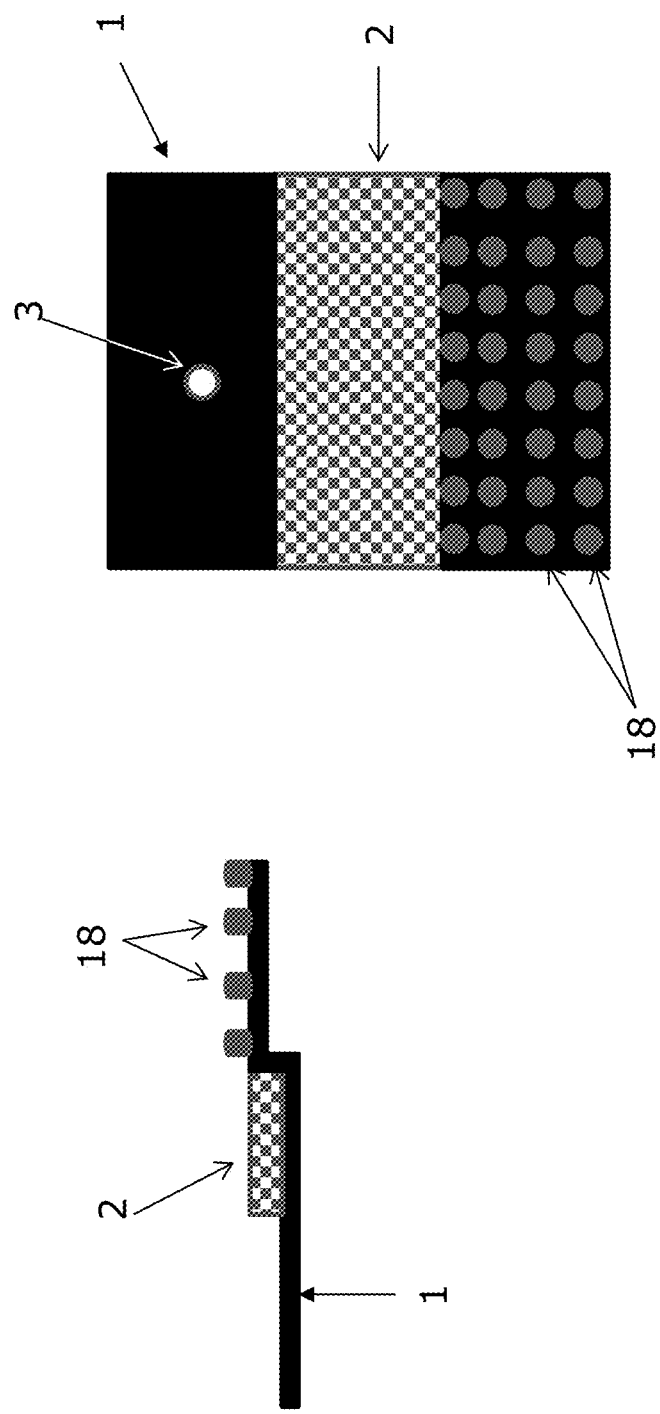
FIG. 12 is a profile and top view of a magnet wall plate utilizing the geometric protrusions to create a mechanical connection.
Figure 13:
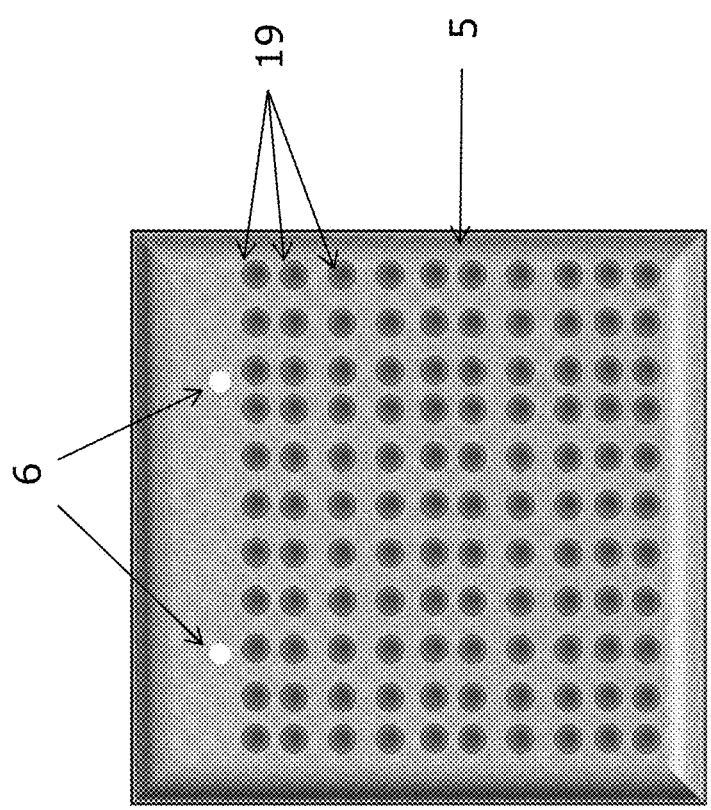
FIG. 13 is a top view of a steel frame plate having numerous geometric depressions.

Referring now to FIG. 12, a wall plate 1 having a magnet 2 adhered to it is shown with a number of raised geometric protrusions 18 on its outer surface extending a further distance beyond the magnet. In this instance the geometric protrusion are in the shape of cylinders. FIG. 13 shows a frame plate having a larger number of geometric depressions 19. The installer will attach the wall plate to a wall by passing a screw through hole 3 and tightening the screw. The frame plate is attached to the back of the framed art. The installer simply attaches the frame plate by matching the depressions 19 to the protrusions 18 in the wall plate. As a consequence of this, the magnet on the wall plate will contact the steel on the frame plate. There is produced a magnetic connection between the magnet and the steel and a mechanical connection between the geometric protrusions and the corresponding geometric depressions even though there is a loose attachment between the protrusions and depressions. If the installer is dissatisfied with the location of the framed art on the wall, he or she can simply put out the frame plate with framed art attached from the magnet wall plate and then move the position of the frame plate and then reattach the frame plate into the wall plate by placing one or more of the geometric depressions on the frame plate into the geometric protrusions on the wall plate.

The invention claimed is:

1. A framed art hanging system for hanging framed art onto a wall, the system comprising:
   a first attachment portion configured for attachment to at least one of a back of the framed art or the wall, the first attachment portion including a magnet; and
   a plate configured for attachment to the other of the framed art or wall, the plate including magnetically attractive material, wherein a coating containing an abrasive substance is positioned on one of the magnet and the plate and a second coating containing a deformable substance is positioned on the other of the magnet and the plate, the second coating deforming to conform to at least a portion of the abrasive substance when the magnet and the plate are pulled together as a result of the magnetic connection thereby forming a mechanical connection therebetween when coupled together.

2. The art hanging system of claim 1 wherein the abrasive substance is selected from the group consisting of sand, ground glass, ground stone, metal shavings and combinations thereof.

3. The art hanging system of claim 1 wherein the coating containing the abrasive substance is applied at a thickness from about 75 microns to about 1000 microns.

4. The art hanging system of claim 1 wherein the deformable coating is selected from the group consisting of rubberized sealants, soft plastics, latex rubber and combinations thereof.

5. The art hanging system of claim 1 wherein the deformable coating has a thickness of about 100 microns to about 500 microns.

6. The art hanging system of claim 1 further comprising an indicator spot and consumer instructions for identifying a desired location to secure a wall plate to a wall, said wall plate comprising a magnet which is adhered to a metal plate.

* * * * *